3,268,629
MONOESTERS OF PHOSPHONIC ACIDS
Emile Cherbuliez and Joseph Rabinowitz, Geneva, Switzerland, assignors to Hooker Chemical Corporation, Niagara Falls, N.Y., a corporation of New York
No Drawing. Filed Oct. 11, 1962, Ser. No. 230,315
4 Claims. (Cl. 260—956)

The present invention relates to new phosphonic monoesters and to an improved process for making phosphonic monoesters. According to the invention, an alcohol is reacted with an anhydride of a phosphonic acid to produce phosphonic monoesters of high purity in very good yields.

As anhydrides of phosphonic acids there are preferably used those commonly known as phosphonic oxides. These anhydrides can be prepared by known methods, as for example, by the action of the dichloride of a phosphonic acid according to the equation:

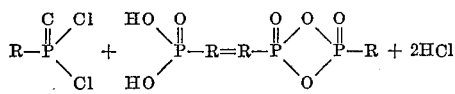

in which R represents an aliphatic, aromatic or heterocyclic radical, usually of 1 to 18 carbon atoms, most often of 2 to 10 carbon atoms; these radicals may be substituted, as for example, with a nitro group or a halogen atom, such as fluorine. The radical R may more especially be represented by a monocyclic aryl radical; such as the phenyl, halogeno-phenyl, e.g. p-fluoro-phenyl, p-chloro-phenyl, p-bromo-phenyl or nitro-phenyl e.g. p-nitro-phenyl radical.

As a phosphonating agent, one may also use polyphosphonic acids, that is, the partial anhydrides of phosphonic acids, which give a lesser yield of ester, but which permit the recovery, in the form of alkaline earth metal phosphonate, of the phosphonic acid which did not react and which may thus be used for another charge. The polyphosphonic acids are considered to be phosphonic anhydrides.

The polyphosphonic acids are obtained by heating corresponding phonsphonic acids at a temperature between about 120 to 200° and under vacuum (about 3 to 30 millimeters of mercury) for a period of about 48 to 96 hrs. The pyrophosphonic acids may also be prepared by the action of given quantity of water on corresponding dichlorides.

It is sufficient to mix an equivalent of phosphonic oxide $(R-PO_2)_n$ with 0.5 to 3 moles, especially with 1.2 to 3 moles of anhydrous $R_1OH$ alcohol (excess alcohol) and to heat the mixture for a period of 3 to 48 hours at temperatures of between 20 and 200°, preferably between 50 and 150° and the reaction may also be carried out under vacuum. The mixture becomes homogeneous and the phosphonic monoester is obtained, which is generally separated in the form of its salt.

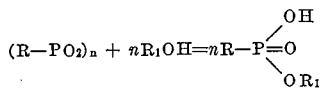

In the above reaction R has the significance indicated previously and $R_1$ represents an aliphatic, araliphatic, aromatic or heterocyclic radical. These radicals, especially the aliphatic radicals, may contain double or triple bonds, which remain intact during the reaction. The radicals $R_1$ which usually are of 1 to 18 carbon atoms, may also carry one or more compatible substituents such as halogen atoms, particularly chlorine or fluorine, free or esterified hydroxyl or carboxyl groups, carboxamide, nitrile or amino groups, preferably tertiary substituted amino groups of nitrogen atoms, for example, aliphatic radicals such as methyl or ethyl groups or aromatic or araliphatic radicals such as a phenyl or benzyl radical. These substituents may be found in any compatible position of the indicated radicals with respect to the —OH to be phosphonated.

Thus, this reaction is a general one and applies to various alcohol types. If a polyol is treated by a phosphonic oxide, only one functional —OH is phosphonated, whatever the quantity of oxide is used. Among the polyols are glycerol, glycol, pentaerythritol, neopentyl glycol, 1,4-(hydroxymethyl)benzene, sorbitol and trimethylol-propane. With the halogenated alcohols, and particularly with the chlorinated and fluorinated alcohols, the reaction is carried out quite normally and the halogen is retained. With the amino-alcohols this reaction proceeds quite well when the amino function is tertiary. Despite the fact that the phenylphosphonic oxide has a tendency to react with primary and secondary amines to yield phosphonic amides, there are obtained phosphonic monoesters of amino-alcohols with unreacted primary or secondary amino groups and only a minimal percentage of phosphonic amide. This amidized group may, if desired, be readily hydrolyzed in an acid medium when the ester portion is relatively stable. The phosphonation reaction is also readily accomplished in and in good yield with unsaturated alcohols having double or triple bonds, singly or in multiple. The reaction is more rapid with primary than with secondary alcohols; thus, heating for a longer time will be desirable during phosphonation of a secondary alcohol.

A preferred embodiment of this invention is the reaction of an alcohol with an anhydride of a phosphonic acid in the presence of a tertiary base; such as tri-lower alkylamine e.g. tri-ethyl-amine or tri-methyl-amine or a cyclic tertiary base, such as pyridine. The addition of an equivalent of the said tertiary base is especially advantageous if the radical $R_1$ is the radical of a tertiary aliphatic alcohol or the radical of an alcohol sensitive to acid, such as a terpene alcohol.

If the radical $R_1$ is the radical of an α-nitrilo-alcohol, the nitrile group may be hydrolysed to form an ester of an α-carboxamido-alcohol. If the reaction mixture does not contain any water, there may be intermediate formation of a cyclic derivative of the ester, which is easily hydrolyzed with water to form the monoester of the α-carboxamido-alcohol. With β,γ- and δ-nitrilo-alcohols the monoesters of the nitrilo-alcohols are preferably obtained; the hydrolysis to the carboxamido derivative does not take place.

The monoesters obtained can be isolated as their metal salts. The alkaline or alkaline earth metal salts of phosphonic monoesters are practically neutral in aqueous solution (pH about 6) and can be preserved indefinitely in aqueous solution (at this pH the time of half-hydrolysis in a 0.1 molar aqueous solution of ester at 100° is greater than 500 hours); the salts of phosphonic monoesters of amino-alcohols are alkaline in aqueous solution (pH 10.5–11) and also are stable at this pH.

In order to isolate the alkaline earth metal or alkali metal salts of the phosphonic monoester, including the calcium, barium, strontium, sodium, potassium, lithium, aluminum and magnesium salts, one proceeds as follows:

After cooling, the excess alcohol is distilled (when a large excess is used) under vacuum. The residue is taken up by water and neutralized by a hydroxide of an alkaline earth metal to a pH of 8.2 (turning of phenolphthalein). (In the case of amino-alcohols, it is desirable to add hydroxide sufficient to obtain a pH of about 11). The phosphonic acid which may still be present (formed by hydrolysis of the oxide which may not have reacted, or formed in the course of the reaction when polyphosphonic acid is used) precipitates partially as an alkaline earth metal salt;

it is completely precipitated by the addition of 1 vol. of alcohol. This is filtered and the filtrate which contains the alkaline earth metal salt of the phosphonic monoester is evaporated and dried under vacuum. Generally, the product obtained is pure. If not, it is purified by extraction with boiling acetone (which dissolves the impurities); after cooling, the alkaline earth metal salt of the phosphonic monoester is filtered.

If it is desired to obtain alkali metal salts of these monoesters, the alkaline earth metal salt is dissolved in water and there is added the required quantity of carbonate of an alkali metal. The precipitate of the alkaline earth metal carbonate formed is filtered off and the filtrate is evaporated to dryness under vacuum. The amorphous residue treated by acetone is transformed into a crystalline precipitate which is the alkali metal salt of the monoester. One may adapt the above methods to make other salts.

The alkaline earth metal salts of the phosphonic monoesters of superior aliphatic alcohols or of terpene alcohols are generally insoluble in water or in 50% ethyl alcohol. In order to isolate these monoesters, one proceeds preferably as follows:

(a) After cooling, the reaction mass is taken up by ether and neutralized by triethylamine. The triethylammonium salt of the phosphonic acid is filtered off, whereas the triethylammonium salt of the phosphonic monoester is soluble. The ether and the excess of the tertiary base are distilled, the residue is taken up by ether and the alkali earth metal salt of the phosphonic monoester is precipitated by adding an aqueous solution of the corresponding alkali earth metal halogenide. The precipitate is washed with water and is purified as previously described.

(b) If the reaction is carried out in the presence of a tertiary base such as trimethylamine, triethylamine or pyridine, the reaction mixture is taken up by ether and the phosphonate of the tertiary amine is filtered off. The ether and the excess of the tertiary base are distilled and the residue is taken up by water. The alkaline earth metal salt of the phosphonic monoester is precipitated by adding an aqueous solution of an alkali earth metal halogenide.

If the free phosphonic monoester crystallizes easily; the reaction mixture is taken up by water and the free phosphonic monoester is precipitated by adding a strong acid, such as hydrochloric acid (this is the case for instance of menthyl-phenylphosphonic acid).

This new process of phosphonation of alcohols by phosphonic oxides and polyphosphonic acids has a number of advantages: it leads straight to monoesters only, it is simple and directly gives pure products in very high yield, calculated as a percentage of the theoretical value. Moreover, the process is quite general and many of the prepared phosphonic monoesters are new.

The monoesters thus obtained and their salts may be used as pharmaceutical products or as intermediates for the production of such and other products, as additives to liquid fuels, such as gasoline, or as products for impregnating fibres so as to make them fireproof, pest-resistant or vermin-proof.

The invention is illustrated but not limited by the following examples. All parts are by weight and all temperatures are in degrees centigrade, unless otherwise indicated.

*Example 1*

140 parts (1 equivalent) of phenylphosphonic oxide $(C_6H_5\text{---}PO_2)_n$ and 48 to 64 parts (1.5 to 2 moles) of anhydrous methanol are heated to 100° (bath temperature). After cooling the excess alcohol is evaporated under vacuum and the residue is taken up with 500 to 800 parts of $H_2O$. This solution is neutralized by $Ca(OH)_2$ (or $Ba(OH)_2$ if one desires to obtain a barium salt of the monoester) up to a pH at which phenolphthalein turns to colored form (about 8.2). Then an equal volume of alcohol is added and the calcium (or barium) phenylphosphonate thus precipitated is filtered. The filtrate, evaporated to dryness, yields the monomethylphenylphosphonate of calcium (or barium) which is generally pure initially. If it is not, the dry residue is dissolved in boiling acetone and, after cooling, the calcium or barium monomethylphenylphosphonate is filtered. The yield in pure product,

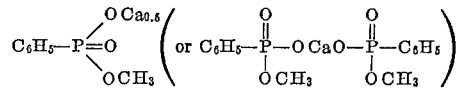

is 77 percent of theoretical.

Instead of phenylphosphonic oxide, other aryl phosphonic oxides may be employed to obtain corresponding salts of aryl phosphonic monoesters.

*Example 2*

The phenylphosphonic monoesters (in the form of their calcium or barium salts) of the alcohols mentioned below have been prepared in the same manner as described in Example 1.

The monoester of ethanol of the formula:

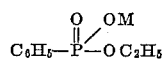

Yield=84%.

The monoester of propanol of the formula:

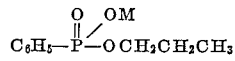

Yield=90%.

The monoester of isopropanol of the formula:

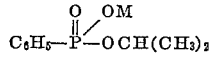

Yield=56%.

The monoester of butanol of the formula:

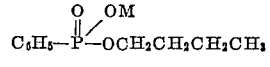

Yield=75%.

The monoester of isobutanol of the formula:

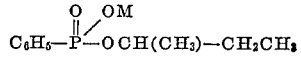

Yield=60%.

The monoester of amyl alcohol of the formula:

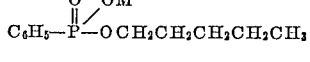

Yield=71%.

In all the above formulas M is $Ca_{0.5}$ or $Ba_{0.5}$.

*Example 3*

The esters described in Examples 1 and 2 were also obtained with the aid of polyphenylphosphonic acid ($n=2$) as the phosphonating agent, in the following manner:

In a flask connected to a water-jet pump and immersed in an oil bath, 140 parts (1 mole) of phenylphosphonic acid are heated gradually to 200° (bath temperature) and are kept for about 48 hours to 72 hours at that temperature and under vacuum. This treatment produces a polyphenylphosphonic acid with a degree of condensation of about 2, which can be verified by the loss of weight of the flask or by acidimetric titration (the titratable acidity between the respective colorings of methyl orange and phenolphthalein greatly diminishes). After cooling, 1.5 to 2.0 moles of alcohol are introduced into the flask, with the operation being continued in the manner described in Example 1. There is obtained a phenylphosphonic monoester in the form of its barium or calcium salt, described under Examples 1 and 2, with yields of 51% for the methyl monoester, 44% for the ethyl monoester, 33% for the propyl monoester, 22% for the isopropyl monoester, 40% for the butyl monoester, 27% for the isobutyl ester and 22% for the amyl ester. These yields are clearly below those obtained with the oxides (Examples 1 and 2) but as in the Examples 1 and 2, one may recover all the phenyl phosphonic acid which is not transformed into an ester, in the form of an alkaline earth metal salt.

*Example 4*

140 parts (1 equivalent) of phenylphosphonic oxide and 84 to 112 parts (1.5 to 2.0 moles) of propargyl alcohol are heated to 90°. One then isolates the monopropargylphenylphosphonate of barium or calcium in the manner already described in Example 1. It is illustrated by the structural formula

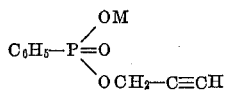

and the yield is 70%.

By infrared spectroscopic examination, the presence of the —C≡C— group is verified.

In the same manner, there is prepared in 90% yield, phenylphosphonic monoester of allyl alcohol

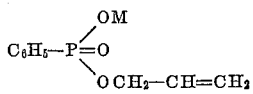

All of these are new products.
In the above formulas $M=Ca_{0.5}$ or $Ba_{0.5}$.

*Example 5*

140 parts (1 equivalent) of phenylphosphonic oxide and 120 to 161 parts (1.5 to 2.0 moles) of 2-chloroethanol are heated for 16 hours at 120° (bath temperature). After cooling, the excess of chlorohydrin is distilled off under vacuum and one isolates the barium salt of the mono(2-chloroethyl)-phenylphosphonic acid;

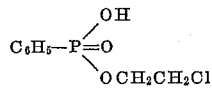

in a yield of 85%.

In a similar manner except for the temperature and duration of heating (which are shown in parentheses), the phosphonic monoesters of halogenated alcohols mentioned below are obtained, with yields indicated.

Phenylphosphonic monoester of 3-chloropropanol-1 (100°, 16 hours) of the formula:

$$C_6H_5-P\overset{OH}{\underset{OCH_2CH_2CH_2Cl}{=}}O$$

Yield=84%.

Phenylphosphonic monoester of 4 - chlorobutanol - 1 (50°, 16 hours) of the formula

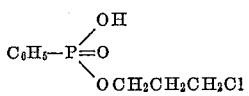

Yield=65%.

Phenylphosphonic monoester of 1,3-difluoropropanol-2 (130°, 48 hours) of the formula

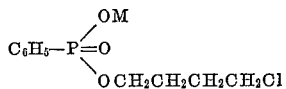

Yield=56%.

Phenylphosphonic monoester of 3 - fluoropropanol - 1 (100°, 48 hours) of the formula

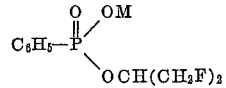

Yield=40%.

Phenylphosphonic monoester of 2,2,3,3-tetrafluoropropanol-1 (100°, 48 hours) of the formula

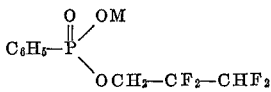

Yield=60%.

All of these are new products.
In the above formulas $M=Ca_{0.5}$ or $Ba_{0.5}$.

*Example 6*

140 parts (1 equivalent) of phenylphosphonic oxide $(C_6H_5-PO_2)_n$ and 91 to 124 parts (1.5 to 2.0 moles) of glycol are heated 48 hours at 100° (bath temperature). There is isolated the calcium or barium salt of the (2-hydroxyethyl-1)-phenylphosphonic acid,

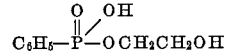

in the manner described in Example 1, with a yield of 60%.

In a similar manner, except as it relates to the temperature for the tetramethyleneglycol, there are prepared the alkaline earth metal salts of phenylphosphonic monoesters of diols mentioned below with the yields indicated:

Phenylphosphonic monoester of propanediol-1,3 of the formula:

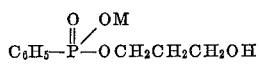

Yield=65%.

The phenylphosphonic monoester of butanediol-1,4 (here the reaction takes place at 50°, for 48 hours) of the formula:

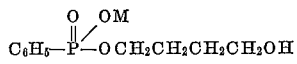

Yield=72%.

Phenylphosphonic monoester of pentanediol-1,5 of the formula:

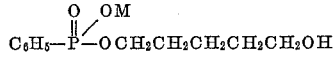

Yield=77%.

In the case of butanediol-1,4 (tetramethyleneglycol), the temperature should not exceed 60° C., in order to avoid the formation of tetrahydrofurane in the phosphonation process.

Also, even if there is used a large excess of a phosphonating agent, only one group —OH is phosphonated.

All of these esters are new.
In the formulas given $M=Ca_{0.5}$ or $Ba_{0.5}$.

*Example 7*

140 parts (1 equivalent) of phenylphosphonic oxide and 267 to 336 parts (3 to 4 moles) of dimethylcolamine (dimethylaminoethanol) are heated for 3 hours at 120°. The excess of dimethylcolamine is distilled off under vacuum and the residue is dissolved in 800 to 1000 parts of water. There is then added an excess of calcium hydroxide in suspension in water with the mixture being agitated for several minutes. After filtering, 1 volume of alcohol is added to the filtrate to completely precipitate the calcium phenylphosphonate still present. This is followed by further filtration and evaporation under vacuum. An amorphous residue is obtained, which, after being treated with boiling acetone, cooled and filtered, yields a precipitate of calcium dimethylaminoethylphenylphosphonate. The formula of this compound is

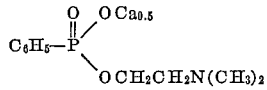

and it was obtained in 50% yield.

In treating 1-diethylaminopropanol-2 in the above described manner, there is obtained by evaporation under vacuum an aqueous alcoholic solution of calcium (1-diethylaminopropyl-2)-phenylphosphonate,

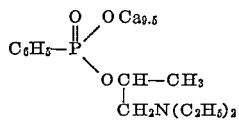

which is pure. The yield is 30%.

*Example 8*

140 parts (1 equivalent) of phenylphosphonic oxide and 152.5 (2.5 moles) of colamine are heated at 180° (bath temperature) up to the point where the mass becomes homogeneous. Then a vacuum is created in the flask, which is kept at this temperature overnight. After cooling, the reactive mass is dissolved in 800 to 1000 parts of water with the addition of an excess of calcium hydroxide. This mixture is agitated and an equal volume of ethanol is added. The liquid is filtered and evaporated dry under vacuum. The residue is treated with boiling alcohol and yields, after cooling, a precipitate of calcium (2-aminoethyl)-phenylphosphonate,

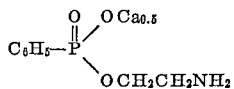

in 40% yield.

*Example 9*

140 parts (1 equivalent) of phenylphosphonic oxide, 79 parts (1 mole) of pyridine and 111 to 148 parts (1.5 to 2.0 moles) of tertiary butanol are heated for 1 night at 75° (bath temperature). A calcium or barium salt of t-butyl-phenylphosphonic acid,

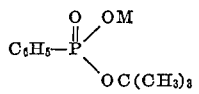

is obtained in a yield of 60% by isolation in the manner described under Example 1.

*Example 10*

1 mole of cetylic alcohol and 1 equivalent of phenylphosphonic oxide are heated for 48 hours at 110°. After cooling, the reaction mixture is taken up by ether, and 4 equivalents of triethylamine are added. The precipitate of triethylammonium phenylphosphonate is filtered off, whereas the triethylammonium salt of the monoester is soluble. The ether and excess of triethylamine are evaporated under reduced pressure and the residue is taken up by ether. This solution, treated with aqueous barium chloride, yields a gelatinous precipitate which is filtered off, washed with water and then with acetone and ether, and finally dried in vacuum over $P_2O_5$. The yield is 50% of pure barium cetyl phenylphosphonate:

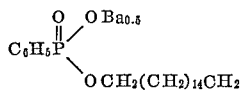

When cetyl alcohol, used as starting material in the above example, is replaced by one of the alcohols of the following formulas:

$$CH_3(CH_2)_6CH_2OH, \quad CH_3(CH_2)_8CH_2OH$$

or $CHF_2(CF_2)_9CH_2OH$ and when using the described procedure, the following barium phenylphosphonic monoesters are obtained:

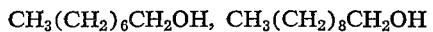

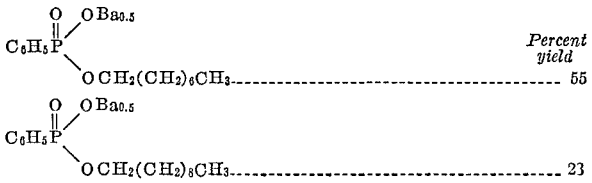

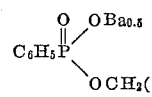

*Example 11*

1 mole of nerol, 2 moles of triethylamine and 1 equivalent of phenylphosphonic oxide are mixed carefully (the reaction is exothermic and it is necessary to cool). After a few minutes the mixture becomes homogeneous. It is then heated at 100° for 15 hours (with good agitation). After cooling, the reaction mass is taken up by anhydrous ether. The triethylammonium phenylphosphonate is filtered off and the ether and the excess of triethylamine are evaporated under reduced pressure. The oily residue is dissolved in water and the pH brought to about 5, by adding dilute hydrochloric acid. When an excess of a concentrated aqueous solution of calcium chloride is added to the preceeding solution, a voluminous precipitate of the calcium salt of the phenylphosphonic monoester appears. This precipitate, which retains most of the unreacted terpene alcohol, is washed with water and then with acetone which dissolves most of the retained alcohol. To achieve the elimination of the retained alcohol, the precipitate is finally washed with ether and then dried in vacuo over $P_2O_5$. The yield is 30% of pure calcium neryl phenyphosphonate $C_{16}H_{22}O_3PCa_{0.5}$.

In a similar manner, the calcium salts of the phenylphosphonic monoesters of geraniol and farnesol are obtained in 31% yield each.

*Example 12*

3 moles of menthol, 3 moles of pyridine and 3 equivalents of phenylphosphonic oxide are mixed very carefully until the mass liquefies and becomes homogeneous. The mixture is then heated for 15 hours at 70–75°. After cooling, the reaction mixture is taken up by water. This solution is introduced slowly and with agitation in normal hydrochloric acid (3 liters). The precipitate of menthyl phenylphosphonic acid is filtered off, washed with water and then heated at 60°, in vacuo, for one night, in order to eliminate any trace of menthol which has been retained by the precipitate. In this manner, pure menthyl phenylphosphonic acid $C_{16}H_{25}O_3P$, M.P. 91°, is obtained in a 81% yield.

In a similar manner, bornyl phenylphosphonic acid $C_{16}H_{23}O_3P$, M.P. 104–105°, is prepared from borneol in a 88% yield.

*Example 13*

1 mole of lactonitrile and 1 equivalent of phenylphosphonic oxide are heated at 90° for 46 hours. After cooling, the reaction mass is taken up by cold water and is quickly neutralized by barium hydroxide to a pH of 8.2 (turning of phenolphthalein). One volume of cold alcohol is then added to complete the precipitation of the barium phenylphosphonate which is filtered off and discarded. The filtrate is evaporated and the residue is treated with acetone, filtered and dried. The dry residue is treated again several times with acetone in order to eliminate completely any trace of lactonitrile that would be still present, and dried in vacuo. The yield of pure barium 2-carbamido-2-ethyl phenylphosphonate is 89%.

The α-nitrilo-alcohols are transformed, under the described conditions, into the corresponding carboxamidoalkyl phenylphosphonic monoesters; β-,γ-, and δ-nitriloalcohols yield the corresponding nitriloalkyl phenylphosphonic monoesters.

In a similar manner are phosphonated the nitriloalcohols of the following formulas (yield of the barium salt of the monoester in parentheses): NC—$CH_2OH$ (35%); NC—$C(CH_3)_2OH$ (64%); NC—$CH_2CH_2OH$ (70%); NC—$CH(CH_3)$—$CH_2OH$ (34%);

NC—$CH_2CH_2CH_2OH$ (58%)

NC—(CH$_2$)$_3$—CH$_2$OH (59%). The first two nitrilo-alcohols yield the corresponding carboxamidoalkyl phenylphosphonic monoesters and the other nitrilo-alcohols (β-,γ-, and δ-nitrilo-alcohols) yield the corresponding nitriloalkyl phenylphosphonic monoesters.

*Example 14*

1 mole of anhydrous glycerol and 1 mole of phenylphosphonic oxide are heated at 165° until the mass liquefies, and then for 20 hours at 120°. The reaction mass treated in the manner described in Example 1), yields crude barium glyceryl phenylphosphonate. The crude salt is reduced to a very fine powder which is heated for a few minutes with absolute alcohol. After cooling, 1 vol. of acetone is added and the precipitate filtered off, washed with alcohol and vacuum dried. These operations are repeated on this product until pure barium glyceryl phenylphosphonate is obtained. The yield is 49%.

HOCH$_2$—CHOH—CH$_2$OP(O)(C$_6$H$_5$)(OBa$_{0.5}$): barium α-glyceryl phenylphosphonate HOCH$_2$—CH[OP(O)(C$_6$H$_5$)(OBa$_{0.5}$)]—CH$_2$OH: barium β-glyceryl phenylphosphonate The determination of the neighbouring —OH groups by the method of Malaprade indicates that the product is composed of 51.5% of barium α-glyceryl phenylphosphonate and of 48.5% of the β-derivative.

*Example 15*

6 moles of tribromoethanol and 4 equivalents of phenylphosphonic oxide are heated at 90° for 44 hours. After cooling, the reaction mass is taken up by cold alcohol or acetone and poured immediately into 2 liters of water. This mixture is neutralized with barium hydroxide to pH 8.2 and diluted with water to 5 liters. One volume of alcohol is added and the barium phenylphosphonate is filtered off. The filtrate is evaporated to dryness under vacuum, and the residue treated with ether (in order to dissolve any traces of retained tribromoethanol) yields the pure barium tribromoethyl phenylphosphonate having the following formula:

CBr$_3$—CH$_2$OP(O)(C$_6$H$_5$)(OBa$_{0.5}$)

Yield: 70%.

In a similar manner are prepared the phenylphosphonic monoesters of trichloroethanol, trichloroisopropanol and trifluoroethanol:

CCl$_3$—CH$_2$OP(O)(C$_6$H$_5$)(OBa$_{0.5}$)

Yield: 88%.

CCl$_3$—CH[OP(O)(C$_6$H$_5$)(OBa$_{0.5}$)]—CH$_3$

Yield: 78%.

CF$_3$—CH$_2$OP(O)(C$_6$H$_5$)(OBa$_{0.5}$)

Yield: 81%.

*Example 16*

In a similar manner as described in Examples 1 to 15, p-fluorophenylphosphonic monoesters are obtained in good yields when p-fluorophenylphosphonic oxide (a novel oxide) is reacted with the corresponding alcohol.

Using, for example, as starting alcohols: methanol, t-butanol, t-amyl alcohol, propane-1,3-diol, 2-chloro-1-ethanol, n-decanol, 2-amino-1-ethanol, 2-dimethylamino-1-ethanol, lactonitrile and 2-nitrilo-1-ethanol, the following p-fluorophenylphosphonic monoesters are obtained:

R—P(O)(OM)(OCH$_3$) (70%);

(CH$_3$)$_3$COP(O)(R)(OM) (53%)
(C$_2$H$_5$)(CH$_3$)COP(O)(R)(OM) (16%)
HOCH$_2$CH$_2$CH$_2$OP(O)(R)(OM) (70%)
ClCH$_2$CH$_2$OP(O)(R)(OM) (62%)
CH$_3$(CH$_2$)$_8$CH$_2$OP(O)(R)(OM) (62%)
H$_2$NCH$_2$CH$_2$OP(O)(R)(OM) (53%)
(CH$_3$)$_2$NCH$_2$CH$_2$OP(O)(R)(OM) (30%)
H$_2$N—CO—CH(CH$_3$)OP(O)(R)(OM) (38%)
NC—CH$_2$CH$_2$OP(O)(R)(OM) (64%)

R represents the p-fluorophenyl radical (F—C$_6$H$_4$—),

M represents an equivalent of an alkali earth metal, and the yield is indicated in parentheses.

p-Fluorophenylphosphonic oxide reacts with all the other alcohols mentioned in Examples 1 to 15 to yield the corresponding p-fluorophenylphosphonic monoesters.

The p-fluorophenylphosphonic oxide is prepared as follows according to the equation:

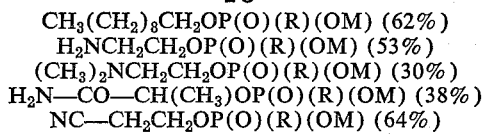

38 g. (0.216 mole) of p-fluorophenylphosphonic acid and 64 g. (0.3 mole) of p-fluorophenylphosphonyl dichloride are heated at 200° for 2 hours (under light vacuum in order to facilitate the elimination of the hydrochloric gas evolved during the reaction). The excess of dichloride is distilled under reduced pressure. After cooling, the residue is heated with 400 ml. of dry benzene until complete dissolution. This solution is left for 2 days at 5° and the precipitate (p-fluorophenylphosphonic oxide) filtered off. The filtrate is left again for 2 days at 5° and a second amount of p-fluorophenylphosphonic oxide is filtered off. The operation is repeated until no further precipitation occurs (after concentation of the solution to 200 ml.). The precipitates are washed with benzene and dried in vacuo at 60°. In this manner 60 g. of pure p-fluorophenylphosphonic oxide, M.P. 109–111°, are obtained (yield 88%).

Calculated (C$_6$H$_4$O$_2$FP)$_2$: F, 12.0%; P, 19.6% Eq. W. 158.1. Found: F, 12.4%; P, 19.3%; Eq. W. 160.

What is claimed is:

1. The phenylphosphonic monoester of propargyl alcohol.
2. A salt of the phenyl phosphonic monoester of propargyl alcohol selected from the group consisting of alkali metal and alkaline earth metal salts of the phenylphosphonic monoester of propargyl alcohol.
3. A calcium salt of the phenylphosphonic monoester of propargyl alcohol.
4. A barium salt of the phenylphosphonic monoester of propargyl alcohol.

References Cited by the Examiner

UNITED STATES PATENTS

| | | | |
|---|---|---|---|
| 2,228,658 | 1/1941 | Farrington et al. | 200—461.310 |
| 2,722,538 | 11/1955 | Jackson | 260—461 |
| 2,965,665 | 12/1960 | Gaertner et al. | 260—461.310 |

FOREIGN PATENTS

| | | |
|---|---|---|
| 595,023 | 3/1961 | Belgium. |
| 740,444 | 11/1955 | Great Britain. |

OTHER REFERENCES

Cherbuliez et al.: "Helv. Chim. Acta," vol. 44, pp. 1802–1805, 1810–1927 (Oct. 21, 1961).

CHARLES B. PARKER, *Primary Examiner.*

IRVING MARCUS, *Examiner.*

F. M. SIKORA, R. L. RAYMOND, *Assistant Examiners.*